United States Patent Office 2,814,147
Patented Nov. 26, 1957

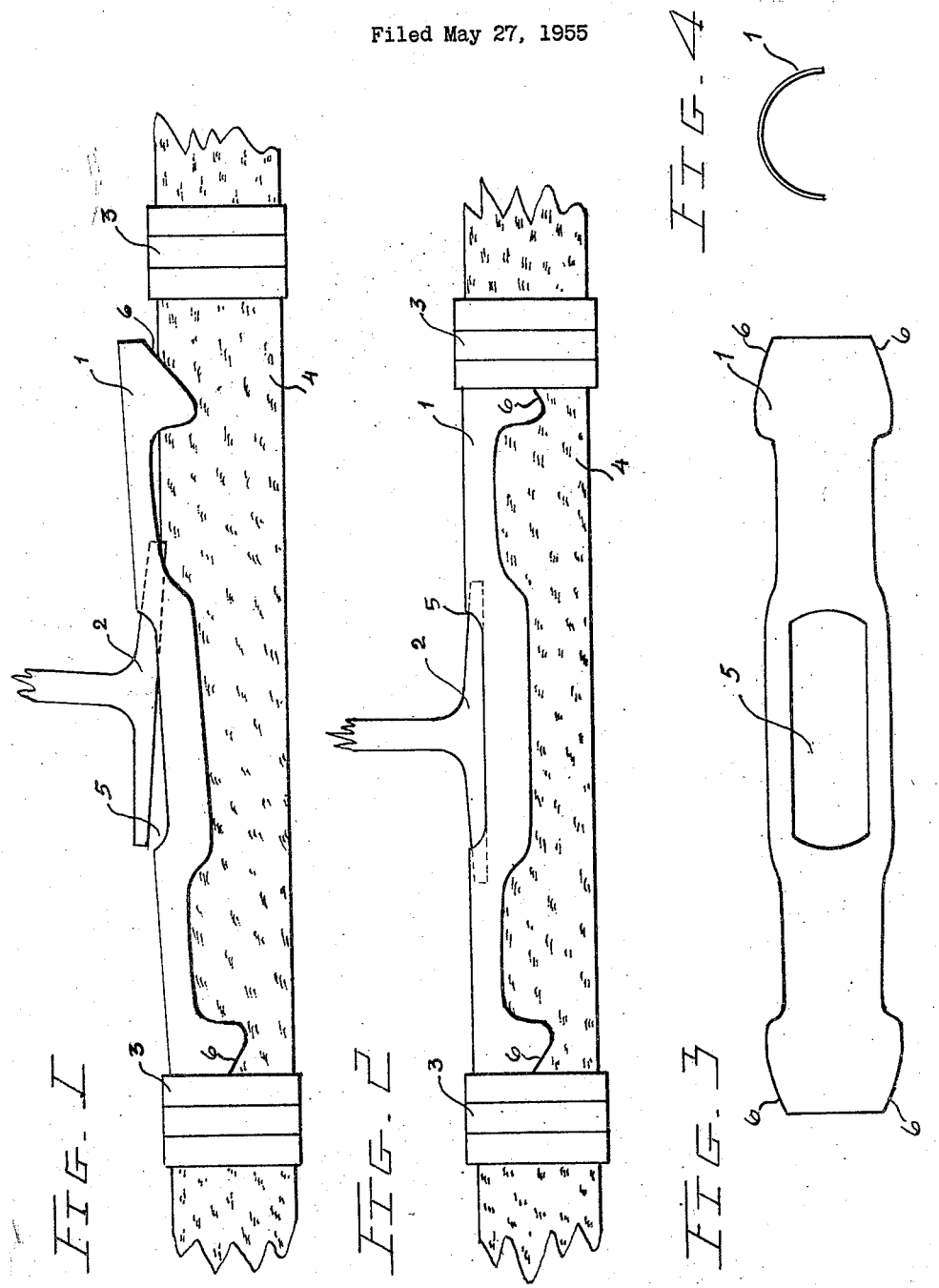

2,814,147

CLAMP FOR HOLDING A REEL UPON A SPINNING FISHING ROD HANDLE

William Miller Henshaw, London, Ontario, Canada

Application May 27, 1955, Serial No. 511,724

3 Claims. (Cl. 43—22)

My invention relates to improvements in means for clamping fishing reels to fishing rod handles and more particularly to a clamp for holding a spinning fishing reel in place on a spinning fishing rod handle.

An object of my invention is to provide an improved clamping means for fishing rod handles which will leave a substantial portion of the fishing rod handle open at the position of the reel base, so that the user is better able to grip the handle of the fishing rod.

A further object of my invention is to provide a clamping means for fishing rod handles which is simple to operate but which effectively clamps the fishing reel directly to the fishing rod handle.

In describing the invention references will be made to the attached drawings in which Figure 1 shows the clamp and reel being attached to the handle. Figure 2 shows the clamp and reel firmly attached to the handle by the rings. Figure 3 shows the shape of the clamp and the slot in its bottom. Figure 4 shows the semi-circular form of the clamp.

The clamp 1 is semi-circular in form and in my specimen is 6½" long. The diameter is approximately 1". The size as to length and diameter may vary in accordance with the type of spinning rod and reel being used. The ends of the clamp are slightly tapered toward its ends as shown in Fig. 3, and bevelled from bottom to top, as shown in Figs. 1 and 2. The bevel at the ends of the clamp is shown at 6 as extending from both side edges at an inclination to the respective ends of the clamp. The beveling of the end portions in this way results in the slight tapered appearance of the end portions, as shown in Fig. 3, due to the fact that the clamp is semi-circular in cross-section. In the bottom of the clamp is a slot 5. See Figures 1, 3 and 4.

The mode of employment is to place the clamp on the cork handle 4 of the spinning rod, adjust it to suit the convenience of the person handling the rod, and draw a ring 3 mounted on the handle over either end, insert the base of the reel 2 in the slot 5, then draw the other ring 3 over the other end of the clamp, thus firmly holding the clamp and reel seat to the handle. (See Figures 1 and 2.) To remove the reel one ring may be pushed from an end of the clamp which will allow it to be lifted and the reel extracted. The ring can then be brought back over the clamp and left on the handle for future use.

The advantage of this clamp is that the hand manipulating the rod is free of the rings which in previous types have been applied directly over the reel base with the result that in manipulating the rod the hand would work one or both of the rings loose and require a re-setting of the reel base. A further advantage is that by reason of the semi-circular shape of the clamp, the remainder of the cork handle is within the grip of the user, giving a much better purchase on the rod.

I claim:

1. In a fishing rod handle provided with a pair of movable rings and including means for clamping thereto an elongated fishing reel base having projecting end portions, an elongated reel-clamping member arcuate in cross-section adapted to fit over and cover a portion only of the circumference of the fishing rod handle, said clamping member being provided with a longitudinally-extending reel base-receiving slot intermediate its ends, said slot being somewhat shorter than the reel base so that the portions of the clamping member adjacent the respective ends of the slot are adapted to overlie the respective ends of the reel base when it is inserted in the slot, said reel-clamping member including end portions respectively extending beyond the ends of the slot so that the movable rings on the fishing rod handle may be moved respectively onto the end portions of the reel-clamping member to secure it to the handle and press the reel base between the clamping member and the fishing rod handle, thereby securing the fishing reel to the fishing rod handle.

2. A clamp for clamping an elongated fishing reel base having projecting end portions to a fishing rod handle provided with a pair of movable rings, comprising an elongated clamping member arcuate in cross-section adapted to fit over and cover a lengthwise section of a portion only of the circumference of a fishing rod handle, said clamping member being provided with a longitudinally-extending reel base-receiving slot intermediate its ends, said slot being somewhat shorter than the reel base so that the portions of the clamping member adjacent the respective ends of the slot are adapted to overlie the respective ends of the reel base when it is inserted in the slot, said clamping member including end portions respectively extending substantially beyond the ends of the slot so that the movable rings on the fishing rod handle may be moved onto the respective end portions of the clamping member to secure and hold the clamping member and fishing reel to the handle of the fishing rod.

3. A clamp as claimed in claim 2, in which the end portions of the clamping member are beveled, the bevel extending from the side edges to the ends of the clamping member.

References Cited in the file of this patent

UNITED STATES PATENTS

| 887,437 | Smith | May 12, 1908 |
| 2,616,204 | Bennett | Nov. 4, 1952 |

FOREIGN PATENTS

| 926,448 | France | Oct. 1, 1947 |